United States Patent
Deliwala

(10) Patent No.: US 7,289,698 B2
(45) Date of Patent: Oct. 30, 2007

(54) HIGH BITRATE TRANSPORT OVER MULTIMODE FIBERS

(75) Inventor: Shrenik Deliwala, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 11/524,857

(22) Filed: Sep. 21, 2006

(65) Prior Publication Data

US 2007/0081764 A1    Apr. 12, 2007

Related U.S. Application Data

(60) Provisional application No. 60/719,107, filed on Sep. 21, 2005.

(51) Int. Cl.
*G02B 6/26* (2006.01)
*H04B 10/12* (2006.01)

(52) U.S. Cl. ............................. 385/28; 385/43; 385/14; 385/49; 385/123; 385/129; 398/28; 398/144; 398/143

(58) Field of Classification Search ............ 385/27, 385/28, 88, 89, 92, 53, 43, 49, 123, 14, 50, 385/129, 130, 131, 132, 141; 398/143, 144, 398/141, 27, 28
See application file for complete search history.

(56) References Cited

U.S. PATENT DOCUMENTS

| | | | |
|---|---|---|---|
| 4,176,911 A | 12/1979 | Marcatili et al. ............. 385/28 |
| 4,877,300 A | 10/1989 | Newhouse et al. | |
| 5,416,862 A | 5/1995 | Haas et al. .................... 385/28 |
| 5,717,798 A | 2/1998 | Strasser et al. ............... 385/37 |
| 5,761,364 A * | 6/1998 | Knapp et al. ................ 385/123 |
| 6,008,675 A | 12/1999 | Handa .......................... 327/96 |
| 6,377,726 B1 | 4/2002 | Danziger et al. .............. 385/28 |
| 6,477,301 B1 * | 11/2002 | Anthon et al. ................ 385/43 |
| 6,516,120 B2 * | 2/2003 | Roberts et al. ............... 385/43 |
| 6,819,849 B1 | 11/2004 | Tangonan et al. ........... 385/126 |
| 7,016,573 B2 * | 3/2006 | Dong et al. .................... 385/46 |
| 7,184,623 B2 * | 2/2007 | Cai et al. ....................... 385/28 |

(Continued)

FOREIGN PATENT DOCUMENTS

EP    1041409    10/2000    ............... 385/28 X (Continued)

OTHER PUBLICATIONS

"Modal Noise in Multimode Fibers Under Restricted Launch Conditions," Papen et al., *J. of Lightwave Technology*, vol. 17, n. 5 (May 1999).

(Continued)

*Primary Examiner*—Brian M. Healy
(74) *Attorney, Agent, or Firm*—Gauthier & Connors LLP

(57) ABSTRACT

A multimode fiber system includes a transmitter for transmitting an optical signal and a receiver that receives the optical signal. At least one mode filter is coupled between the receiver and the transmitter and passes only a specific set of fiber modes from the transmitter to be received by the receiver. The at least one mode filter comprises a tapered core section that includes a double taper configuration joined at the narrowest regions and in which each end of the two tapers has dimensions compatible with the fiber at that end.

18 Claims, 5 Drawing Sheets

U.S. PATENT DOCUMENTS

| | | | |
|---|---|---|---|
| 7,194,156 B2 * | 3/2007 | Deliwala | 385/29 |
| 7,215,846 B1 * | 5/2007 | Deliwala | 385/28 |
| 2002/0031304 A1 * | 3/2002 | Roberts et al. | 385/43 |
| 2003/0133661 A1 | 7/2003 | Adibi et al. | |

FOREIGN PATENT DOCUMENTS

| | | | |
|---|---|---|---|
| EP | 1245973 | 10/2002 | |
| EP | 1460785 | 9/2004 | 385/123 X |
| WO | 2000/41016 | 7/2000 | |
| WO | 2002/27371 | 4/2002 | |

OTHER PUBLICATIONS

"Reduction of Modal Noise by Using Reduced Spot Excitation," Saijonmaa et al., *Applied Optics*, vol. 20, n. 24 (Dec. 15, 1981).

"An Experimental and Theoretical Study of the Offset Launch Technique for the Enhancement of the Bandwidth of Multimode Fiber Links," Raddatz et al., *J. of Lightwave Technology*, vol. 16, n. 3 (Mar. 1998).

"Enhanced Multimode Fiber Link Performance Using a Spatialy Resolved Receiver," Patel et al., *IEEE Photonics Technology Letters*, vol. 14, n. 3 (Mar. 2002).

"Exploiting Diversity in Multimode Fiber Communications Links Via Multisegment Detectors and Equalization," Argon et al., *IEEE Communications Letters*, vol. 7, n. 8 (Aug. 2003).

"Light Coupling by a Vortex Lens into Graded Index Fiber," Johnson et al., *J. of Lightwave Technology*, vol. 19, n. 5 (May 2001).

"Selective Excitation of Parabolic-Index Optical Fibers by Gaussian Beams," Saijonmaa et al., *Applied Optics*, vol. 19, n. 14 (Jul. 15, 1980).

"A Mode-Filtering Scheme for Improvement of the Bandwidth-Distance Product in Multimode Fiber Systems," Haas et al., *J. of Lightwave Technology*, vol. 11, n. 7 (Jul. 1997).

"Dispersive Multiplexing in Multimode Fiber," H.R. Stuart, *Th V2-1/30*, no date.

"Differential Mode Loss and Mode Conversion in Passive Fiber Components Measured Using the Chromatic Launching and the Central Spot Far Field Techniques," Severin et al., *J. of Lightwave Technology* vol. LT-4, n. 11 (Nov. 1986).

"A Statistical Analysis of Conditioned Launch for Gigabit Ethernet Links Using Multimode Fiber," Webster et al., *J. of Lighwave Technology*, vol. 17, n. 9 (Sep. 1999).

* cited by examiner

HIGH BITRATE TRANSPORT OVER MULTIMODE FIBERS

PRIORITY INFORMATION

This application claims priority to provisional application Ser. No. 60/719,107 filed Sep. 21, 2005, and to U.S. patent applications Ser. Nos. 10/988,778, filed Nov. 15, 2004, now U.S. Pat. No. 7,215,846, and 11/056,890, filed Feb. 11, 2005, now U.S. Pat. No. 7,194,156, all of which are incorporated herein by reference in their entireties.

BACKGROUND OF THE INVENTION

The invention relates to the field of mode couplers used in receivers, and in particular the invention allows use of external simple patch cords to enable 10 G and higher bitrate over glass and plastic multimode fibers.

Most long distance fiber links greater than 200-300 m use lasers with the wavelengths greater than 1200 nm and specifically at the wavelengths around 1310 nm, 1490 nm, 1510-1570 nm, and 1620 nm. These links also employ single mode fibers with core diameter of approximately 8 μm. On the other hand, fiber links less than 200 m for short reach communications are often dominated by a wavelength around 850 nm and use multimode fibers with core diameter anywhere from 50micron to 120 microns. The standard single mode fiber use in the 1200-1600 nm range becomes dual mode fibers for 850 nm transmission.

Use of standard fibers (those that are designed to be single mode in the 1200-1600 nm window) with 850 nm wavelength would result in excitation of both the modes (with variable amplitudes depending on the launch conditions as well as factors such as the imperfections and bends in the fiber). These modes travel at different speeds and thus high speed transmission becomes difficult due to overlap of data pulses after traveling some distance in the fiber.

At the other extreme, multimode glass/plastic fibers are used with a typical core diameter of 50/62.5 micron that support 100's of modes. Each of these modes travel at different speeds and the resulting modal dispersion that limits the bandwidth-distance product. Recently, many have used restricted mode launch, e.g., launch laser beam to excite a subset of modes (mostly the higher order modes) that significantly underfills the multimode fiber core to increase the effective bandwidth-distance product due to excitation of fewer modes as well as those that are likely to have similar group velocity.

SUMMARY OF THE INVENTION

According to one aspect of the invention, there is provided a multimode fiber system. The system includes a transmitter for transmitting an optical signal and a receiver that receives the optical signal. At least one mode filter is coupled between the receiver and the transmitter and passes only a specific set of fiber modes from the transmitter to be received by the receiver. The at least one mode filter comprises a tapered core section that includes a double taper configuration joined at the narrowest regions and in which each end of the two tapers has dimensions compatible with the fiber at that end.

According to one aspect of the invention, there is provided a method of performing the operations of multimode fiber system. The method includes transmitting an optical signal from a transceiver, and receiving the optical signal at a receiver. Also, the method includes providing at least one mode filter is coupled between the receiver and the transmitter and passes only a specific set of fiber modes from the transmitter to be received by the receiver. The at least one mode filter comprises a tapered core section that includes a double taper configuration joined at the narrowest regions and in which each end of the two tapers has dimensions compatible with the fiber at that end.

With the help of this invention effective bandwidth of multimode fiber is increased which results in greater distance that high speed data may be transmitted without modal dispersion.

DETAILED DESCRIPTION OF THE INVENTION

Figure 1:
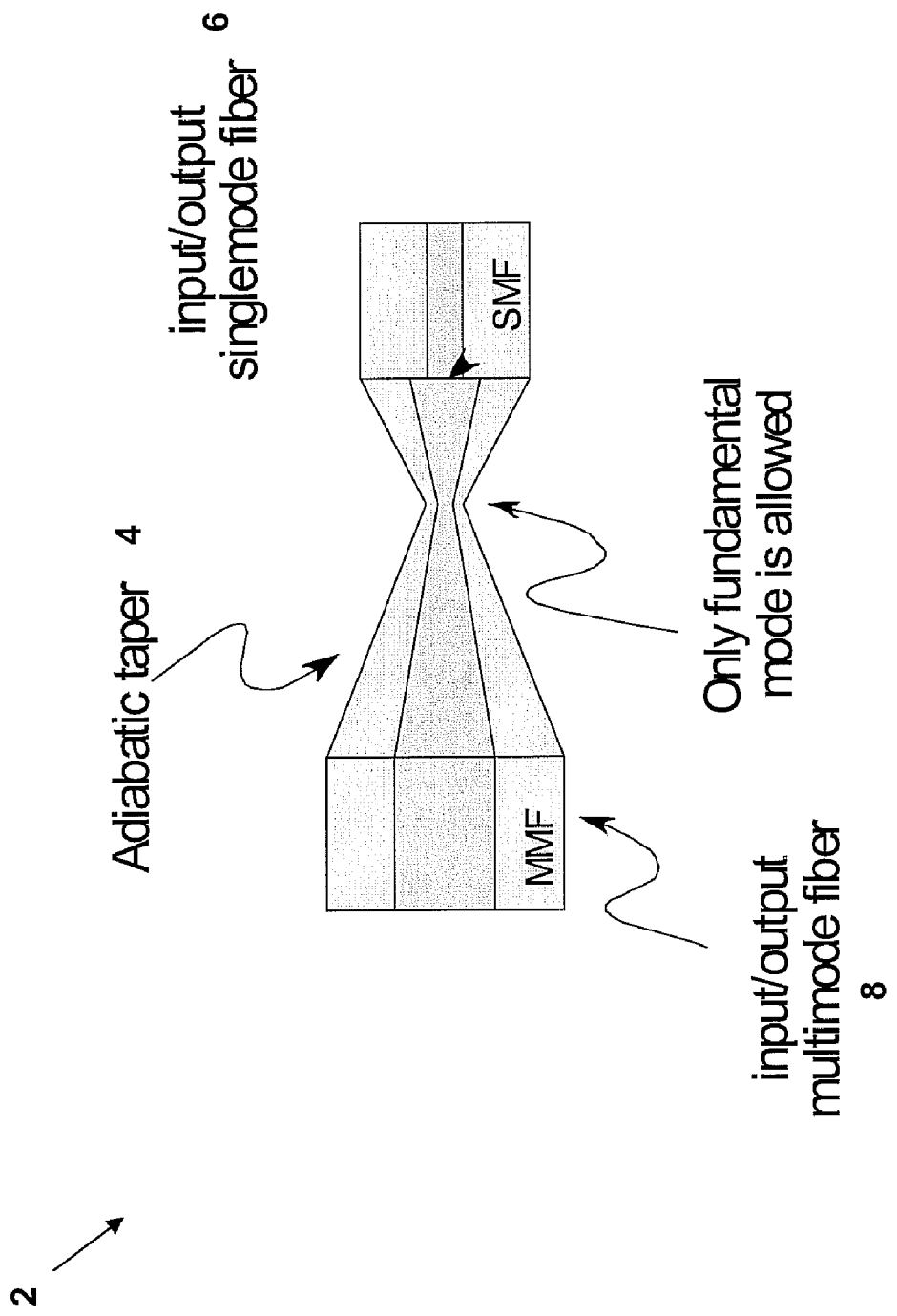
FIG. 1 is a schematic diagram of the in-fiber mode filter.

The invention attempts to increase the effective bandwidth (EB) of a MM fiber by simultaneously using (i) a special form of restricted mode launch from the transmitter and (ii) an optical filter at the output that passes only a specific set of fiber modes and filters out the unwanted modes before the optical signal is detected by a photodiode. The optical filter at the output is an example of a complex linear filter such that any linear combination of the modes of the fiber may be selected at the transmitter for excitation and at the receiver for filtering before detection.

The simplest method to implement the concept outlined above would be to excite only a fundamental mode of the fiber which is traditionally designated as LP01. This is a linearly polarized mode and can be predominantly excited in the fiber with an appropriately matched Gaussian beam. A Gaussian beam will be used having the definition of waist w as $$E_G(r) = e^{-(\frac{r}{w})^2} \qquad \text{EQ. 1}$$

The waist w can be chosen by the choice of lens and other matching optics to primarily excite the fundamental mode of the fiber. For example, for a step-index fiber w can be chosen to couple over 90% of the light to the fundamental mode of an MM fiber. An imaging optic can simply scale the fundamental mode of a SM fiber (which is also $LP_{01}$) to the fundamental mode of the MM fiber. Misalignments in both position and angle would cause excitation of the (unwanted) higher order modes. Also, scattering, bends, and other imperfections along the length of the fiber would cause transfer of signal form the signal mode (chosen to be $LP_{01}$ for this example) to other interfering modes. One may write the complex impulse response of the fiber system as $$h(r, t) = \sum_{lm=all\ modes} \eta_{lm} \exp\left(-\frac{1}{T^2}(t - \tau_{lm})^2\right)[\exp(-i\beta_{lm}z)m_{lm}(r)] \qquad \text{EQ. 2}$$

where $\eta_{lm}$, $\tau_{lm}$, $\beta_{lm}$, and $m_{lm}$ (r) represents the amplitude, modal group delays, propagation constant and the normalized modal field distribution for the fiber under consideration with each mode labeled by the two indices as shown in the figure below. The modal excitation spectrum $\eta_{lm}$ depends on a particular signal launch technique. In EQ. 2, the amplitudes $\eta_{lm}$ at the output may be the same as the input may have changed due to mode-mixing along the propagation path in the fiber. In case of strong mode mixing, computed modal delays and excitation amplitudes can have little bearing on the measured modal delays and excitations since the data has traveled along multiple logical paths, each with corresponding signal delay. In reality, for a short distance transport, the following have been observed or assumed: (a) output modal excitation spectrum is related to the input modal excitation—this is why RML even works, (b) propagation tends to mix modes that have similar electric field profiles and very close propagation constants. These are more conveniently classified by principal mode number v=2 m+l where m is the radial index and l is the azimuthal index, and (c) the lowest order modes are most susceptible to errors in the index profile in the very center of the fiber.

The fiber taper 2 illustrated in FIG. 1 shows a technique to launch most of the energy into the fundamental mode of a multimode fiber.

A multimode fiber at input 8 is tapered down to a single mode condition at output 6 and then the taper 4 is expanded to match the mode of the single mode fiber at output 6. The minimum core diameter from tapering is determined from the single mode condition for the chosen multimode fiber. For a typical glass multimode fiber, the taper 4 can have a minimum core radius of 2-5 microns. The actual minimum core radius is calculated to achieve the single mode condition for a given refractive indices of cladding and core. Thus the output of this taper 4 only transmits the fundamental mode of the multimode fiber. The taper 4 needs to be adiabatic, in order to prevent mode conversions in the taper.

A single taper—without the second taper to expand the mode size to match the single mode fiber—can be used as the mode filter. It will be used either with a lens system or with on-chip couplers. The invention uses a double taper by re-expanding from the minimum core radius to match the mode of the single mode fiber at the other end. This ensures compatibility with high speed transceiver systems and ease of insertion of mode filter in the high-speed optical data path. Note that the mode filter is a bidirectional device and thus may be used near the transmitter as well as the receiver. It is obvious that the other end may be expanded to match not only the single mode fiber but another multimode fiber having the same core diameter or a different core diameter. Such a device may be inserted in the middle of the fiber to filter out unwanted modes at any point along the link.

Figure 2A:
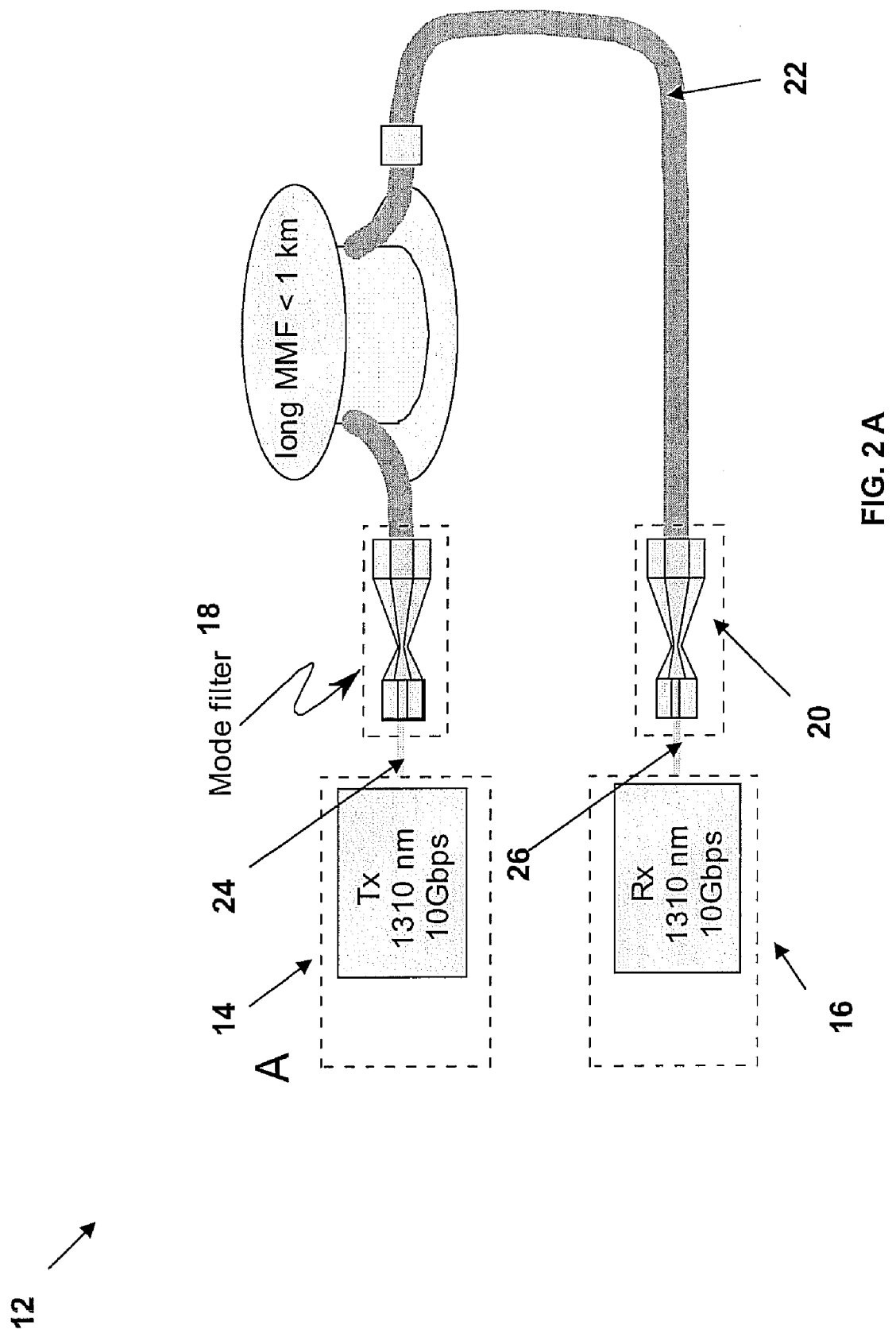
FIGS. 2A-2B are schematic diagrams illustrating the use of mode filters in a communication system.

FIG. 2A shows how such a mode filter can be used to extend the bandwidth of the multimode fiber system 12. An input mode filter 18 receives the single mode input from a transmitter 14 via launch fiber 24, and matches the fundamental mode of the long multimode fiber 22. At the other the mode filter 20 receives the signal from a long multimode fiber 22 and the mode filter 20 filters down the signal to be processed by the receiver 16 via launch fiber 26.

If the long multimode fiber 22 and the launch fibers 24, 26 from which the mode filters 14, 16 are made are identical, then there is perfect match for the fundamental modes. Otherwise the fundamental mode of the mode filters 24, 26 will be slightly different than the fundamental mode of the launch fibers 24, 26. This would result in excitation of other modes of the long multimode fiber 22. Even when the fundamental modes of the filters 14, 16 are matched with the long multimode fiber 22, any misalignment will result in the excitation of other modes.

This is particularly true if the long multimode fiber 22 has connectors along the way which generate other modes thru misalignment of different section of fiber. In either case, for a Gaussian like fundamental mode most of the energy from the fundamental mode of filters 14, 16 will excite fundamental Gaussian like mode of the long multimode fiber 22. Thus, almost ideal single mode launch conditions are achieved. For a typical length of the multimode fibers of less than a kilometer, mode conversions can be neglected. Mode conversions may occur due to misaligned connectors along the fiber path in a typical system. Again, small misalignments will lead to small excitation of other modes with most of the launch power confined to the fundamental mode.

The other interfering modes—excited by connector mismatch, alignment mismatch or mixing of fiber types—may be filtered at the receiver end by using the same mode filter in reverse. In this case, only the fundamental mode (which has the maximum overlap with the fundamental mode of the filter) will be transmitted to the single mode side of the receiver.

Note that the purpose of these mode filters is to keep the interference from other modes generated along the way to minimum. The mode filter simply attenuates any energy transferred to these other higher order modes and prevents the information traveling along these modes at different speeds to interfere with the information in the target fundamental mode.

Figure 2B:
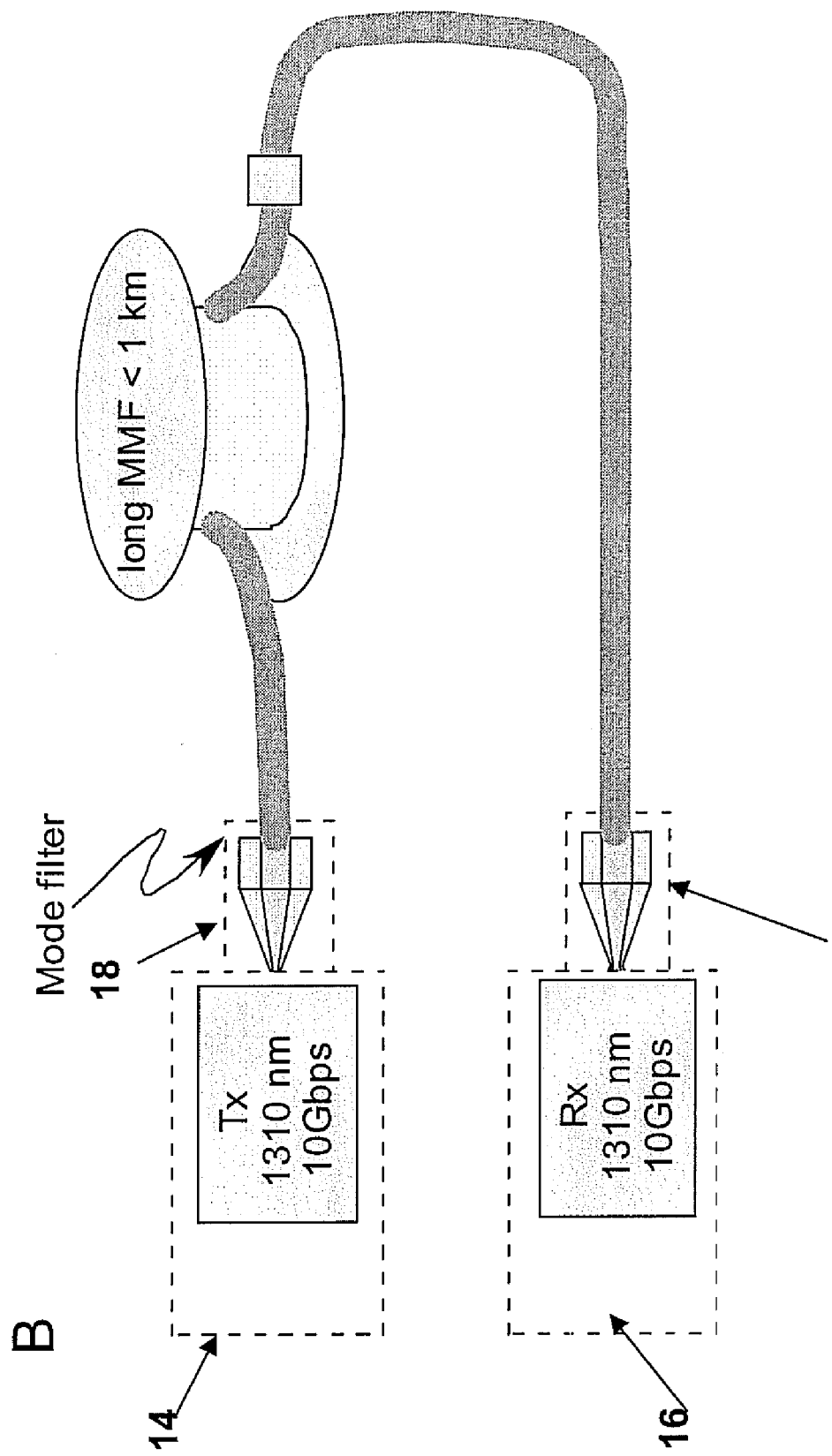

It is possible to use these adiabatic filters directly with on-chip couplers available with integrated optics. These couplers are designed to couple small modes typical of standard single mode fibers rather than multimode fibers. This is shown in FIG. 2B where are no associated input mode fiber for the mode filters 18, 20. The adiabatic portions of these fibers 18, 20 are directly connected to either the transmitter 14 or receiver 16. These transceivers have the single mode couplers on the chip.

Figure 3:
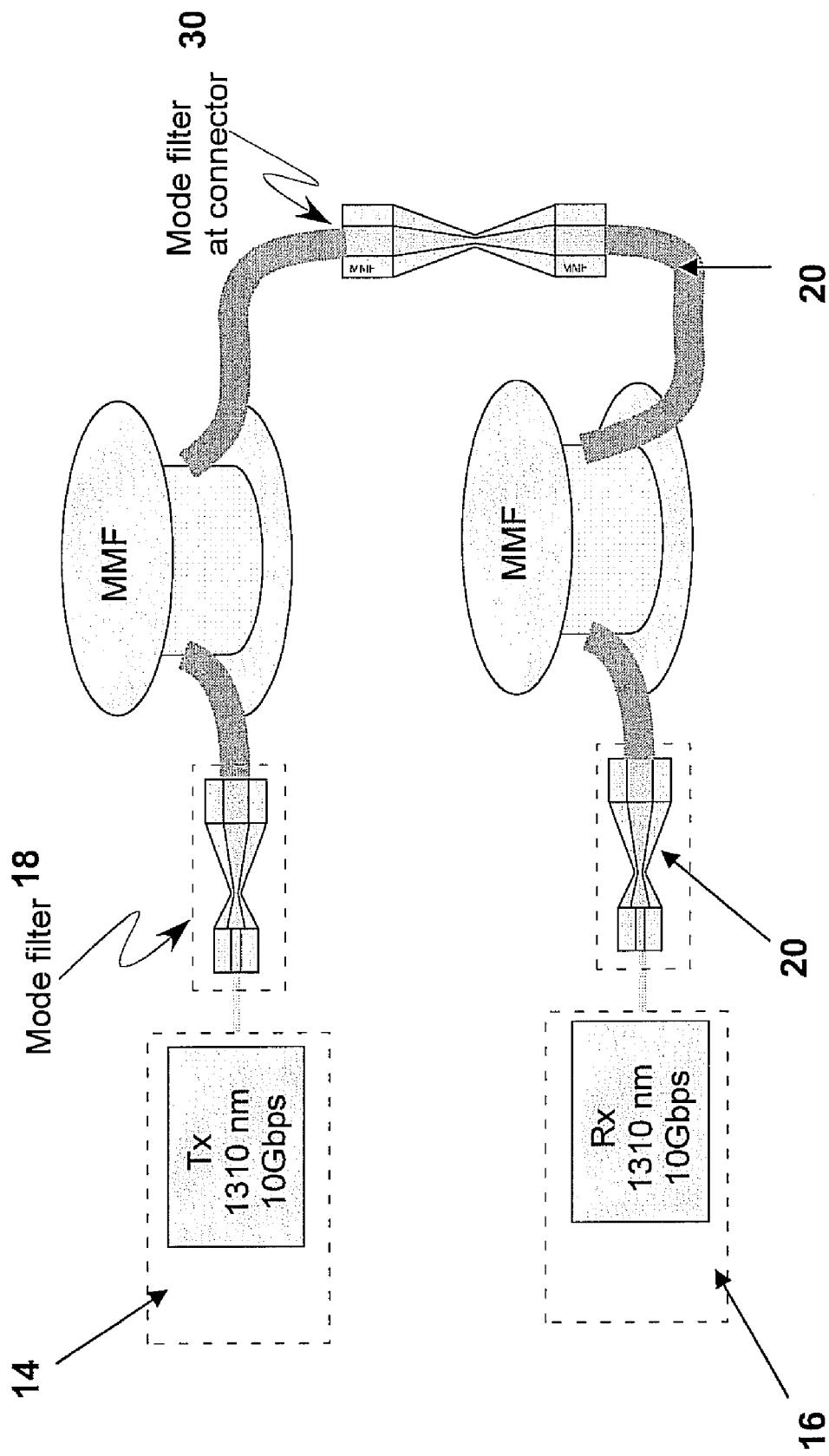
FIG. 3 is schematic diagram showing mode filter between the two multimode fiber links.

In FIG. 3, a mode filter 30 is inserted between the two lengths of the multimode fiber 22. In this case, mode filter 30 such as one shown in FIG. 1 is symmetric with both ends terminated in to a multimode fiber.

The insertion of the multimode filter 30 will ensure that only the fundamental mode is transmitted. In general, misalignment as well as mode mismatches at the connector will lead to substantial mixing of the incoming modes and generation of the higher order modes in the outgoing fiber. By placing the mode filter 30, this mixing and generation of unwanted mode is minimized.

Figure 4:
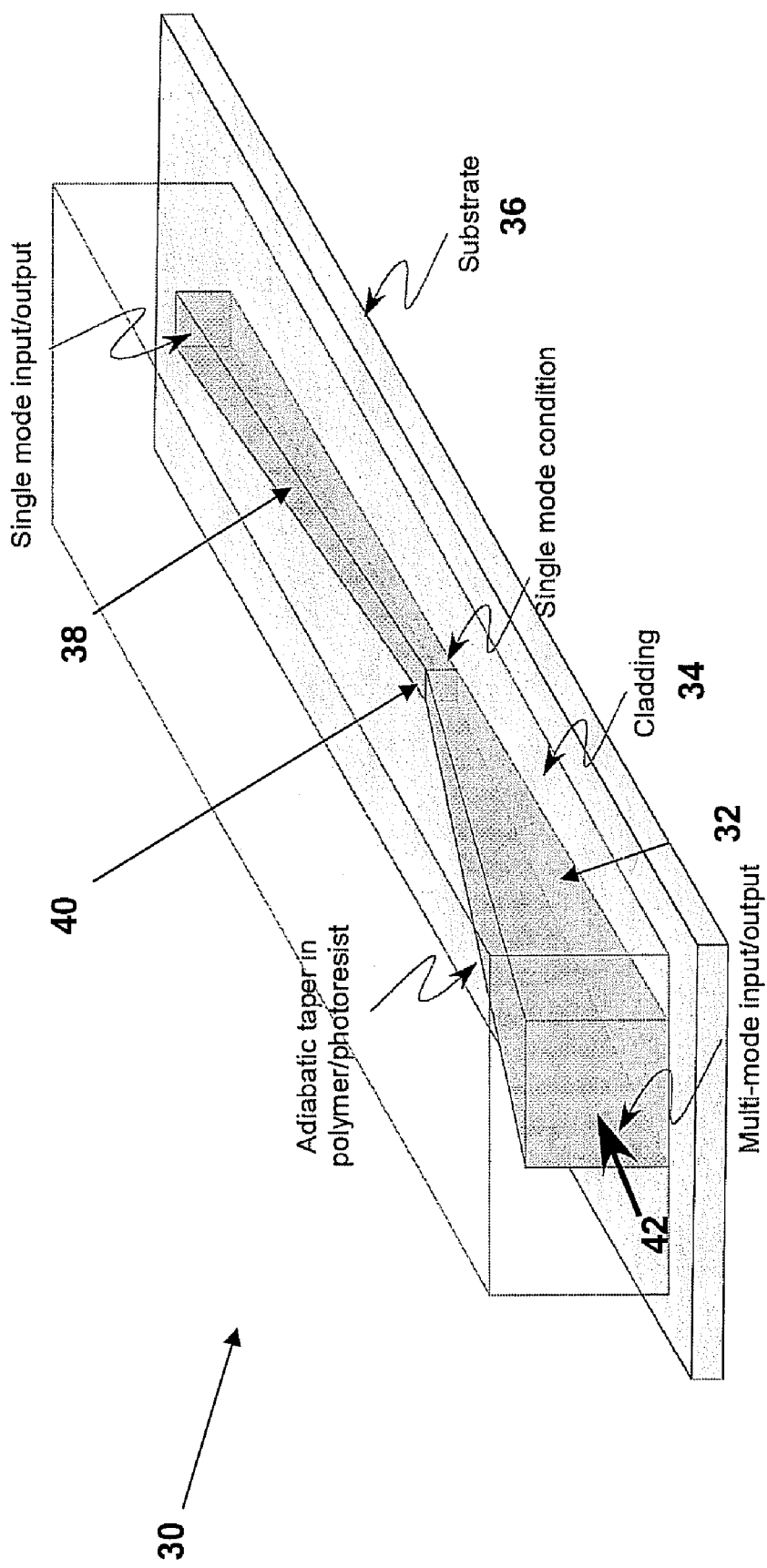
FIG. 4 is a depiction of planar mode filter using polymers or thick film technology.

In FIG. 4, another technique of realizing a mode filter 30 formed in accordance with this invention. In this technique, the dual or single taper 40 is implemented on a planar substrate 36 using thick polymer based waveguides. The mode filter 30 includes multi-mode core 32, a single mode core 38, which could be multimode, and an adiabatic taper 40 reaching single mode condition coupling a multi-mode fiber to the multimode portion 32 to the single mode fiber to the single mode portion 38. The two adiabatic tapers are joined at 40 where the minimum core diameter is set to ensure single mode condition. The mode filter 30 is formed on and surrounded by a cladding layer 34.

This type of mode filter 30 can be constructed by using various transparent polymers that may be stamped. After stamping the core of the adiabatic taper comprising of tapered sections 32 and 34, one can fill the surrounding with a lower refractive index cladding 34. The choice of refractive indices for cladding 34 and core 38 are determined by the single mode condition that must be reached at the minimum dimension of the double adiabatic taper and the matching the modes of the input and output fibers.

This can be made more compactly then the fiber based filter and can become part of the connector assembly. These types of mode filter 30 can also be incorporated in the design of a transceiver assembly providing direct interface to the multimode fibers. The height at the multimode input 42 is designed to couple majority of the energy of the fundamental mode of the multi-mode fiber 32. Thus, for typical multimode fibers made from glass or plastic, the height at the multimode end may be in the range of 30-200 microns. Note that the entire mode filter is capped by a cladding layer 34 with a suitably chosen index contrast. The choice of index contrast determines the length of the mode filter as well as controls the dimension at which the single mode condition is reached. Smaller dimensions are particularly suitable for coupling to on-chip mode couplers.

It is obviously possible to extend this to use multimode fiber at both ends so that a specific set of modes from one end are transmitted to the other.

Thus, in general we may say that the two facets of the double taper configuration are designed to be compatible with the optical modal properties of the fibers attached to each of the individual ends. There is a specific test to the compatible design: One should ensure that there is not a substantial mode mixing at the interface between the fiber and the mode filter. This is particularly true when interfacing with multimode fibers. As an example, imagine that the double taper is designed to pass only the fundamental mode and the mode filter connects single mode (SM) fiber (SMF) at one end to the multimode fiber at the other end. Now further imagine that the light is coming from the multimode fiber and is composed of many modes.

The goal of the multimode fiber is to transmit only the fundamental mode energy of multimode fiber to the SM side. If the mode filter design was done such that the optical modes on the multimode fiber side and the mode filter side facing the multimode fiber are not compatible, then there will be substantial mixed-up the modes of multimode fiber as it entered the mode filter. This means that the signal transmitted to the SMF will contain energy from other modes of multimode fiber as they were substantially mixed, and can defeat the purpose of inserting the mode filter to enhance the effective bandwidth of the channel. In practice, some mode mixing is inevitable, but it must be minimized so that information in the chosen mode (the one transmitted by the mode filter) is preserved.

Another way to describe the mode filter is that it only allows the preferred mode—the one it is designed to transmit—to predominantly exist in the channel. All other modes —either created along the channel, at other connectors due to misalignment etc. are suppressed or rejected when passed thru the mode filter. Thus mode filter may be said to preserve the modal quality of the channel. This is particularly true when the mode filter is inserted in the middle of a long multimode fiber. Even if the desired mode was launched at the transmitter, the energy from the launched mode is spread to the other unwanted modes (traveling at different group velocity) as light travels down the fiber.

This process occurs due to inevitable bends, defects in the fiber, connectors, vibrations etc. Also, this process converts energy back from the unwanted modes to the chosen mode. Thus, once sufficient energy is spread to the other modes, it becomes difficult to recover the information impressed on the original transmitted mode because of many exchanges of information along the channel length between unwanted modes and the desired mode. By placing the mode filter, before there is substantial build up of energy in the unwanted modes, this exchange is prevented and the modal quality of the channel is preserved. This will extend the distance high speed data can be sent in the multimode fiber.

It may be easiest to implement such a mode filter as part of the typical fiber optical connector that joins to fiber ends. Thus, this enhanced connector will also ensure that effects of modal mixing in the channel are suppressed.

Although the present invention has been shown and described with respect to several preferred embodiments thereof, various changes, omissions and additions to the form and detail thereof, may be made therein, without departing from the spirit and scope of the invention.

What is claimed is:

1. A multimode fiber system comprising:
a transmitter for transmitting an optical signal;
a receiver for receiving said optical signal; and
at least one mode filter that is coupled between said receiver and said transmitter and passes only a specific set of fiber modes from said transmitter to be received by said receiver, said at least one mode filter comprises a tapered core section that includes a double taper configuration joined at the narrowest regions and in which each end of the two tapers has dimensions compatible with the fiber at that end, wherein
said double taper configuration includes at least two tapered regions where one of said at least two tapered regions receives said optical signal and tapers down said optical signal to a single mode condition and another of said tapered regions is expanded to match the mode of the fiber at that end, said at least two tapered regions are directly coupled to each other so as increase the bandwidth of said multimode fiber.

2. The multimode fiber system of claim 1, wherein said transmitter outputs said optical signal to comprise a single mode output.

3. The multimode fiber system of claim 1, wherein said receiver receives said optical signal comprising a single mode.

4. The multimode fiber system of claim 1, wherein said transmitter is directly coupled to one of said at least one mode filter.

5. The multimode fiber system of claim 1, wherein said receiver is directly coupled to one of said at least one mode filter.

6. The multimode fiber system of claim 1, wherein said transmitter is directly coupled to said at least one mode filter.

7. The multimode fiber system of claim 1, wherein said tapered section of the core fiber includes a minimum diameter of 2-5 micron at its narrow end.

8. The multimode fiber system of claim 1, wherein said multi mode filter is used to extend the bandwidth of the multimode fiber system.

9. The multimode fiber system of claim 1, wherein said at least one mode filters is coupled at the transmitter end or at the receiver end or between a connector to preserve the mode quality.

10. A method performing the operations of a multimode fiber system comprising:
transmitting an optical signal from a transmitter;
receiving said optical signal at a receiver; and
providing at least one mode filter that is coupled between said receiver and said transmitter and passes only a specific set of fiber modes from said transmitter to be received by said receiver, said at least one mode filter comprises a tapered core section that includes a double taper configuration joined at the narrowest regions and in which each end of the two tapers has dimensions compatible with the fiber at that end, said double taper configuration includes at least two tapered regions where one of said at least two tapered regions receives said optical signal and tapers down said optical signal to a single mode condition and another of said tapered regions is expanded to match the mode of the fiber at that end, said at least two tapered regions are directly coupled to each other so as increase the bandwidth of said multimode fiber.

11. The method of claim 10, wherein said transceiver outputs said optical signal to comprise a single mode.

12. The method of claim 10, wherein said receiver receives said optical signal comprising a single mode.

13. The method of claim 10, wherein said transceiver is directly coupled to one of said at least one mode filter.

14. The method of claim 10, wherein said receiver is directly coupled to one of said at least one mode filter.

15. The method of claim 10, wherein said transceiver is directly coupled to said at least one mode filter.

16. The method of claim 10, wherein said tapered multimode fiber includes a minimum radius of 2-5 micron at its tapered end.

17. The method of claim 10, wherein said multi mode fiber is used to extend the bandwidth of the multimode fiber system.

18. The method of claim 10, wherein said at least one mode filters is coupled at the transmitter end or at the receiver end or between a connector to preserve the mode quality.

* * * * *